Feb. 8, 1966  MASAKAZU MATSUMOTO ET AL  3,234,195
FRACTIONATION OF POLYVINYL ALCOHOL
Filed June 27, 1961
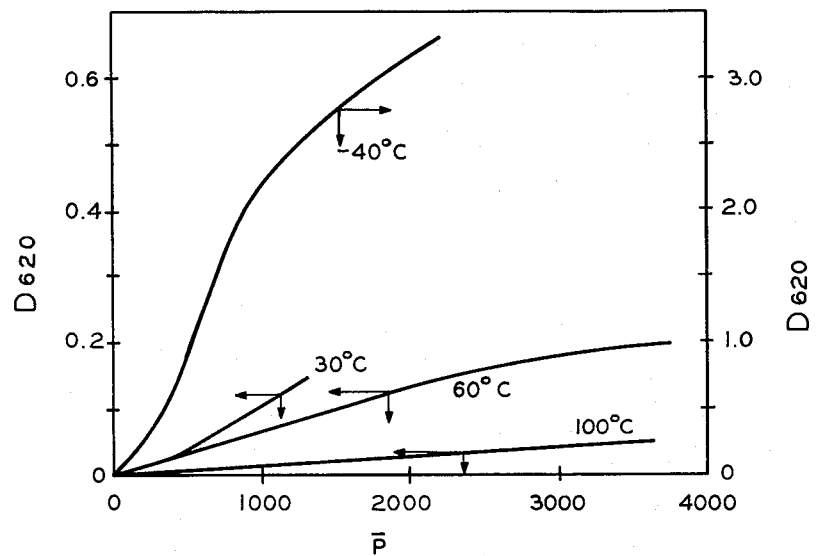
INVENTORS
MASAKAZU MATSUMOTO
KIYOKAZU IMAI
BY
ATTORNEY

FRACTIONATION OF POLYVINYL ALCOHOL

Masakazu Matsumoto and Kiyokazu Imai, Kurashiki, Japan, assignors to Kurashiki Rayon Co., Ltd., Kurashiki-shi, Japan, a corporation of Japan
Filed June 27, 1961, Ser. No. 120,058
Claims priority, application Japan, July 20, 1960, 35/31,777
4 Claims. (Cl. 260—91.3)

The present invention relates to a method of separating polyvinyl alcohol into fractions differing in crystallinity.

It has recently been disclosed that the crystalline property, i.e. the crystallinity, of polyvinyl alcohol varies with the method and conditions employed in producing it, more particularly with the method of polymerizing the vinyl ester to produce the polyvinyl ester, e.g. polyvinyl acetate, from which the polvinyl alcohol is derived. Accordingly, a polyvinyl alcohol obtained in a particular manufacturing system may be a mixture of various kinds of polyvinyl alcohol of different degrees of crystallinity. It is thus reasonably presumed that various polyvinyl alcohols having different crystalline properties may be obtained from a particular polyvinyl alcohol batch, provided that the polyvinyl alcohol batch is satisfactorily fractionated with respect to crystallinity. However, neither the presumption that polyvinyl alcohol may be fractionated with respect to its crystallinity nor an effective method for such fractionation has heretofore been established.

It is accordingly an object of the present invention to provide means for producing polyvinyl alcohols having different crystalline properties, or degrees of crystallinity from a given batch of polyvinyl alcohol.

It is another object of the invention to provide a method for effectively fractionating polyvinyl alcohol with respect to degrees of crystallinity.

In accordance with this invention, it has now been found that it is possible effectively to fractionate polyvinyl alcohol into fractions of different crystallinities by making use of the tendency of aqueous polyvinyl alcohol solutions to foam. The polyvinyl alcohol contained in the layer of foams formed by shaking an aqueous polyvinyl alcohol solution was studied, and it was found that the degree of polymerization ($\bar{P}$) of the polyvinyl alcohol contained in the layer of foams is nearly the same as that of the original polyvinyl alcohol, but it was found that the value of $D_{620}$ in its iodine color reaction is quite different from that of the polyvinyl alcohol contained in the residual solution, generally the value of the former exceeding that of the latter. The expression $D_{620}$ represents the absorbance for the maximum absorption at 620 m$\mu$ of the iodine-complex of polyvinyl alcohol. We have determined that with polyvinyl alcohols of the same degree of polymerization, the values of $D_{620}$ substantially directly correspond to the differences in the degree of crystallinity of the polyvinyl alcohols.

This relationship is illustrated in the accompanying drawing which shows the results of determining the color reaction of fractional products of polyvinyl alcohol with iodine, using polyvinyl alcohols produced from polyvinyl acetate formed by polymerizing vinyl acetate at various polymerization temperatures viz. —40° C., +30° C., +60° C., and +100° C.

From the graph shown in the drawing, it is evident that the values of $D_{620}$ are related not only to the degree of polymerization ($\bar{P}$) but also to the polymerization temperature. On the other hand, it is well known that the so-called crystalline property or crystallinity of polyvinyl alcohol may vary in dependence upon the polymerization temperature. It follows from this fact that the results shown in the drawing establish the existence of a close relation between the value of $D_{620}$ and the crystallinity property of polyvinyl alcohol. Accordingly, the fact that the polyvinvyl alcohol contained in the layer of foams produced by agitating an aqueous solution of polyvinyl alcohol is quite different from the polyvinyl alcohol contained in the residual solution in relation to the color reaction with iodine, although the former is substantially the same as the latter with respect to degree of polymerization degree, shows that the polyvinyl alcohol contained in the solution is fractionated with respect to crystallinity.

Thus, in accordance with the invention, polyvinyl alcohol is fractionated into fractions of different degrees of crystallinity by shaking or vigorously agitating an aqueous solution of the polyvinyl alcohol to be fractionated to cause it to foam and separating the thus produced foam from the residual liquid. To form foams the entire vessel containing the aqueous polyvinyl alcohol solution is suitably shaken or agitated and any of the many conventional mechanical agitating or shaking methods may satisfactorily be employed. In carrying out the invention, the solution is repeatedly shaken or agitated and the foam formed during each period of agitation is at least partially removed before another period of agitation is initiated, and the shaken solution being allowed to stand for a prolonged period of time after each period of agitation.

It is believed that the effective fractionation of polyvinyl alcohol with respect to its crystallinity by the use of the foaming tendencies of aqueous polyvinyl alcohol solutions in accordance with this invention is due chiefly to the fact that the foam stabilizing effect caused by the aging and denaturation of polyvinyl alcohol at the membrane of foam probably varies in relation to the crystallinity of the polyvinyl alcohol. Thus, fractionation is presumed to be effected at the interface. Accordingly, it will be possible to fractionate polyvinyl alcohol with respect to its crystallinity by applying the interfacial phenomena in general, not merely the foaming phenomenon.

The nature and features of the invention will be further apparent from the following specific examples of practical application. However, it will be understood that these examples are not to be construed as limiting the scope of the present invention in any manner. In the examples, all parts are by weight unless otherwise indicated.

EXAMPLE 1

An aqueous solution of fully saponified polyvinyl alcohol produced from polyvinyl acetate obtained by polymerizing vinyl acetate in a 20% methanol solution at 60° C. by the use of 2,2'-azo-bis-isobutyronitrile as a catalyst, was prepared. After filtering this solution, 2.7 kg. of the filtrate were charged to a 5-liter wide-mouthed bottle. The bottle was then horizontally shaken for a predetermined time (indicated in Table 1) by means of a shaker. The solution was subsequently allowed to stand for more than 15 hours. After this, the resulting layer of foam was separated and sampled. The polyvinyl alcohol contained in this layer was designated as F1. The residual solution usually became opaque upon shaking, and a slight amount of gel settled to the bottom of the bottle.

After uniformly dissolving this gel once more by heating, the solution was caused to form froth or foam by shaking it in a shaker. From this layer of foam, more polyvinyl alcohol was sampled, and was designated as F2. Repeating the same operation, the layers of foam were classified into 23 portions.

The initial concentration of the aqueous solution of polyvinyl alcohol was 18.88 g./liter, the amplitude 6.7 cm. and the frequency 100 cycles per minute.

Subsequently, by the use of the polyvinyl alcohol in each portion mentioned above, a series of aqueous solutions having a polyvinyl alcohol concentration of 2.5 g./liter were prepared. Upon mixing each of these solutions with an equal volume of an aqueous solution containing $2 \times 10^{-3}$ M/liter of iodine and $8 \times 10^{-3}$ M/liter of potassium iodate, the absorbance $D_{620}$ at 620 mμ for the maximum absorption of the polyvinyl alcohol-iodine complex was determined, after allowing the resulting mixed solution to stand at 20° C. for 24 hours.

The results of these determinations are shown in Table 1.

*Table 1*

| Fraction Number | Shaking time (days) | Polyvinyl alcohol | | $\overline{P}$ | $D_{620}$ |
| --- | --- | --- | --- | --- | --- |
| | | Yield (g.) | Percentage yield | | |
| F1 | 1 | 1.644 | 3.67 | 1,685 | 0.83 |
| F2 | 1 | 2.336 | 5.21 | 1,650 | 0.74 |
| F3 | 1 | 2.800 | 6.25 | 1,775 | 0.49 |
| F4 | 1 | 2.775 | 6.19 | 1,800 | 0.41 |
| F5 | 1 | 3.125 | 6.97 | 1,895 | 0.53 |
| F6 | 1 | 2.845 | 6.35 | 1,895 | 0.42 |
| F7 | 1 | 2.465 | 5.50 | 1,905 | 0.41 |
| F8 | 1 | 1.702 | 3.80 | 1,865 | 0.27 |
| F9 | 1 | 2.439 | 5.44 | 1,930 | 0.23 |
| F10 | 1 | 1.730 | 3.86 | 1,900 | 0.19 |
| F11 | 1 | 1.492 | 3.33 | 1,950 | 0.19 |
| F12 | 1 | 1.081 | 2.41 | 1,840 | 0.15 |
| F13 | 1 | 1.801 | 4.02 | 1,845 | 0.12 |
| F14 | 1 | 1.349 | 3.01 | 1,860 | 0.10 |
| F15 | 2 | 3.876 | 8.64 | 1,720 | 0.04 |
| F16 | 2 | 2.662 | 5.94 | 1,625 | 0.02 |
| F17 | 2 | 1.295 | 2.89 | 1,580 | 0.01 |
| F18 | 2 | 0.614 | 1.37 | 1,505 | 0.01 |
| F19 | 2 | 0.351 | 0.78 | 1,430 | 0.00 |
| F20 | 1 | 0.340 | 0.75 | 1,505 | 0.01 |
| F21 | 2 | 0.234 | 0.52 | 1,275 | 0.00 |
| F22 | 2 | 0.447 | 1.00 | 1,290 | 0.00 |
| F23 [b] | | 5.412 | 12.08 | 870 | 0.00 |
| F0 [a] | | | | 1,675 | 0.23 |

[a] Original sample not fractionated.
[b] Recovered from the residual solution after sampling the polyvinyl alcohol F22.

*Table 2*

| $\overline{P}$ | $D_{620}$ |
| --- | --- |
| 3960 | 0.31 |
| 2470 | 0.27 |
| 1785 | 0.25 |
| 1350 | 0.20 |
| 1020 | 0.13 |
| 639 | 0.08 |

As seen in Table 1, the degrees of polymerization of the respective portions are not constant. $D_{620}$ shows changes independently of $\overline{P}$.

With fractionation, however, the distribution of the degree of polymerization may change. It is assumed that this change may affect the value of $D_{620}$. Accordingly, the relation between $D_{620}$ and PA of polyvinyl alcohol fractionated with respect to degree of polymerization in accordance with the ordinary method, is shown in Table 2. As found from Table 2, with decrease in $\overline{P}$, the values of $D_{620}$ are also decreased. Thus, the results set forth in Table 1 clearly indicate that the polyvinyl alcohol is satisfactorily fractionated with respect to its crystallinity properties independently of the values of $\overline{P}$.

EXAMPLE 2

There was prepared an aqueous solution having a concentration of 9.52 g./liter of fully saponified polyvinyl alcohol (degree of polymerization: 1565) produced from polyvinyl acetate obtained by the photo-polymerization of a mixture comprising 50 parts of vinyl acetate, 50 parts of methanol and 0.2 part of 2,2'-azobis-isobutylonitrile at 0° C. 500 g. of this solution were charged to a 1-liter wide-mouthed bottle and the bottle was shaken for 8 hours at a frequency of 100 cycles per minute with an amplitude of 10.8 cm. on a horizontal shaker. From the resulting layer of foam, 9.94 g. of polyvinyl alcohol having a degree of polymerization of 1675 was obtained.

The polyvinyl alcohol obtained from the layer of foam was nearly the same as the original polyvinyl alcohol in relation to the degree of polymerization, and the yield was 20%. By determining $D_{620}$ of this polyvinyl alcohol in the manner described in Example 1, a value of 2.48 was obtained. This value was substantially greater than that of the original polyvinyl alcohol, or $D_{620}=1.2$. It is evident that a polyvinyl alcohol of a higher crystallinity than the original polyvinyl alcohol was obtained.

The conditions and the relative relationships set forth in the examples are those preferred in carrying out the process of this invention, but it will be understood that other conditions and relationships may be used within the scope of the invention. In general, unless otherwise indicated, conventional operations and techniques are suitably employed.

The polyvinyl alcohol suitable for use in accordance with the present invention includes polymers composed principally of the vinyl alcohol radical. Polyvinyl alcohol is a polymer containing hydroxyl groups and corresponding to the formula:

$$(-CH_2-CH)_n$$
$$\quad\quad\quad\;\;|$$
$$\quad\quad\quad\;\;OH$$

wherein $n$ is an integer which can vary within wide limits, as is well known in the art. Polyvinyl alcohol can be produced from the corresponding polyvinyl ester, e.g. polyvinyl acetate, by alkaline or acid saponification or re-esterification, i.e. alcoholysis, in accordance with the following equation:

$$\left[-CH_2-CH-\atop |\atop OCOR\right]_n \xrightarrow{H_2O \text{ or } R'OH} [-CH_2-CH-]_n \atop \quad\quad | \atop \quad\quad OH$$
$$+ nHOCOR \text{ or } nR'OCOR$$

Typical polyvinyl alcohols which can be suitably used are described, for example, in Cline et al. U.S. Patent 2,636,803. Preferably the polyvinyl alcohol has a degree of polymerization of at least about 500.

To form the polyvinyl ester for conversion to polyvinyl alcohol, conventional vinyl ester polymerization techniques, catalysts and polymerization apparatus are employed and suitable polymerization catalysts, vessels and techniques are described, for example, in Cline et al. U.S. Patent 2,610,360.

It will also be understood that various changes and modifications in addition to those indicated above may be made in the embodiments herein described without departing from the scope of the invention as defined in the appended claims. It is intended, therefore, that all matter contained in the foregoing description and in the drawing shall be interpreted as illustrative only and not as limitative of the invention.

We claim:

1. A method of fractionating crystalline polyvinyl alcohol in accordance with its crystallinity, said polyvinyl alcohol consisting essentially of the vinyl alcohol radical and having a degree of polymerization of at least 500, which comprises agitating an aqueous solution of said polyvinyl alcohol to be fractionated to form a first polyvinyl alcohol foam fraction, allowing the foamed solution to stand, and removing said first polyvinyl alcohol foam fraction, said first polyvinyl alcohol foam fraction having a higher crystallinity than the average crystallinity of said polyvinyl alcohol to be fractionated, and repeating said agitating, standing, and foam removal steps to obtain another polyvinyl alcohol foam fraction, said other polyvinyl alcohol foam fraction having a crystallinity different from the crystallinity of said first polyvinyl alcohol foam fraction.

2. A method of fractionating crystalline polyvinyl alcohol in accordance with its crystallinity, said polyvinyl alcohol consisting essentially of the vinyl alcohol radical and having a degree of polymerization of at least 500, which comprises agitating an aqueous solution of said polyvinyl alcohol to be fractionated to form a first polyvinyl alcohol foam fraction, allowing the foamed solution to stand, and removing said first polyvinyl alcohol foam fraction, said first polyvinyl alcohol foam fraction having a higher crystallinity than the average crystallinity of said polyvinyl alcohol to be fractionated, and repeating said agitating, standing, and foam removal steps to obtain another polyvinyl alcohol foam fraction, said other polyvinyl alcohol foam fraction having a crystallinity different from the crystallinity of said first polyvinyl alcohol foam fraction, and dissolving by heating any sediment formed before each repeated agitating step.

3. A method of fractionating crystalline polyvinyl alcohol in accordance with its crystallinity, said polyvinyl alcohol consisting essentially of the vinyl alcohol radical and having a degree of polymerization of at least 500, which comprises agitating an aqueous solution of said polyvinyl alcohol to be fractionated to form a first polyvinyl alcohol foam fraction, allowing the foamed solution to stand, and removing said first polyvinyl alcohol foam fraction, said first polyvinyl alcohol foam fraction having a higher crystallinity than the average crystallinity of said polyvinyl alcohol to be fractionated, and repeating said agitating, standing, and foam removal step to obtain another polyvinyl alcohol foam fraction, said other polyvinyl alcohol foam fraction having a crystallinity different from the crystallinity of said first polyvinyl alcohol foam fraction, said agitating being effected for at least about 8 hours and said agitated solution being allowed to stand for at least about 24 hours.

4. A method of fractionating crystalline polyvinyl alcohol in accordance with its crystallinity, said polyvinyl alcohol consisting essentially of the vinyl alcohol radical and having a degree of polymerization of at least 500, which comprises agitating an aqueous solution of said polyvinyl alcohol to be fractionated to form a first polyvinyl alcohol foam fraction, allowing the foamed solution to stand, and removing said first polyvinyl alcohol foam fraction, said first polyvinyl alcohol foam fraction having a higher crystallinity than the average crystallinity of said polyvinyl alcohol to be fractionated, and repeating said agitating, standing, and foam removal steps to obtain another polyvinyl alcohol foam fraction, said other polyvinyl alcohol foam fraction having a crystallinity different from the crystallinity of said first polyvinyl alcohol foam fraction, and dissolving by heating any sediment formed before each repeated agitating step, said agitating being effected for at least about 8 hours and said agitated solution being allowed to stand for at least about 24 hours.

References Cited by the Examiner

UNITED STATES PATENTS

| | | | |
|---|---|---|---|
| 2,162,379 | 6/1939 | Dole et al. | 210—44 XR |
| 2,313,007 | 3/1943 | Abribat | 210—44 XR |
| 2,610,360 | 9/1952 | Cline et al. | 260—91.3 |
| 2,645,599 | 7/1953 | Payne | 252—303 XR |
| 3,087,920 | 4/1963 | Suzumura et al. | 260—91.3 |

OTHER REFERENCES

Jurgensons et al.: A Short Textbook of Colloid Chemistry, pub. 1954, p. 388, John Wiley and Sons Inc., New York.

WILLIAM H. SHORT, *Primary Examiner.*

LOUISE QUAST, *Examiner.*